(12) United States Patent
Shima et al.

(10) Patent No.: US 7,304,917 B2
(45) Date of Patent: Dec. 4, 2007

(54) ACTUATOR

(75) Inventors: Hiroki Shima, Tokyo (JP); Kenji Yamamoto, Kanagawa (JP); Tomomichi Tanaka, Tokyo (JP)

(73) Assignee: Sony Corporation (JP)

( * ) Notice: Subject to any disclaimer, the term of this patent is extended or adjusted under 35 U.S.C. 154(b) by 130 days.

(21) Appl. No.: 10/493,701

(22) PCT Filed: Sep. 18, 2003

(86) PCT No.: PCT/JP03/11924

§ 371 (c)(1),
(2), (4) Date: Apr. 27, 2004

(87) PCT Pub. No.: WO2004/029946

PCT Pub. Date: Apr. 8, 2004

(65) Prior Publication Data

US 2004/0257926 A1    Dec. 23, 2004

(30) Foreign Application Priority Data

Sep. 25, 2002   (JP) ............................. 2002-279527

(51) Int. Cl.
   *G11B 7/00*     (2006.01)

(52) U.S. Cl. .................................... 369/44.15

(58) Field of Classification Search .............. 369/44.15
   See application file for complete search history.

(56) References Cited

U.S. PATENT DOCUMENTS

2003/0007445 A1 *  1/2003  Hashimoto et al. .... 369/112.02

FOREIGN PATENT DOCUMENTS

| JP | 2001-266394 A | | 9/2001 |
| JP | 2002-117568 | | 4/2002 |
| JP | 2003222780 A | * | 8/2003 |

* cited by examiner

*Primary Examiner*—Thang V. Tran
(74) *Attorney, Agent, or Firm*—Rader Fishman & Grauer PLLC; Ronald P. Kananen

(57) ABSTRACT

An actuator (23) includes six suspension members (61) to (64), (71), and (72) that connect a bobbin (5) for holding a lens holder (2) to a suspension base (8), and an aberration-correcting element (9) mounted on the bobbin (5). One-end portions of the two lower suspension members (71) and (72) are fixed to both sides of the aberration-correcting element (9) between which the optical axis of an objective lens (1) is disposed, and the other-end portions of the suspension members (71) and (72) are fixed to both sides of the suspension base (8) spaced in the X-axis direction. First and second driving signals (S1) and (S2) are supplied to the aberration-correcting element (9) through the suspension members (71) and (72).

9 Claims, 8 Drawing Sheets

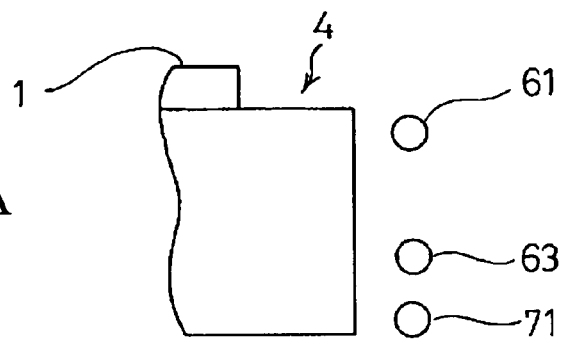
Fig.9A
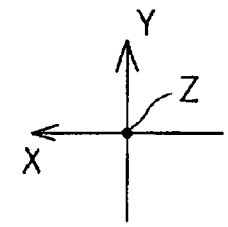
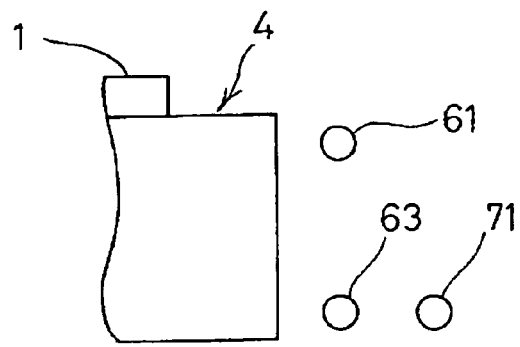
Fig.9B
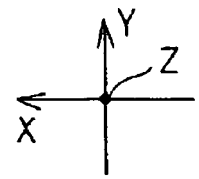

ACTUATOR

TECHNICAL FIELD

The present invention relates to an actuator in an optical pickup.

BACKGROUND ART

Optical discs, such as compact discs and minidiscs used for music, DVDs used for movies or the like, and MO discs and CDs-R/W used for, for example, data recording in computers, are presently available.

In optical disc apparatuses that access such an optical disc, that is, perform recording and/or reading, the size of beam spots formed on an information recording surface of the optical disc has been reduced for a higher recording density by shortening the wavelength of a light beam to be applied to the optical disc and increasing the numerical aperture of an optical system.

However, when an optical disc is accessed with an objective lens having a high numerical aperture, spherical aberration is caused by variations in thickness of a light-transmitting layer in the optical disc.

While, in general, it has been considered to increase the numerical aperture of the objective lens by adopting a so-called duplet lens, spherical aberration is also caused by variations in distance between the lenses in this case.

In a case in which the recording capacity is increased by adopting a multilayer information recording surface in the optical disc, spherical aberration is also caused by such a multilayer structure.

In order to correct such spherical aberration, an optical unit has been proposed in which a spherical-aberration-correcting element is provided between an objective lens and a laser source and in which the aberration-correcting element is combined with the objective lens (Japanese Unexamined Patent Application Publication No. 2002-117568 (FIG. 1)).

The optical unit includes an actuator for moving the optical unit in the tracking direction and the focusing direction. An elastic member for supporting the optical unit is made of a conductor, and the conductor is used as a wire.

A signal for driving the aberration-correcting element is superimposed on a signal for driving the actuator and is supplied to the wire. In the optical unit, the driving signal for the actuator and the driving signal for the aberration-correcting element are separated by a signal separating means.

In such an optical unit in which the aberration-correcting element and the objective lens are combined, however, noise is readily produced in the driving signals, and this decreases the S/N ratio and deteriorates the characteristics. Moreover, since means for superimposing and separating the driving signals is necessary, the configuration is complicated, and the production cost and parts cost are increased.

In a case in which an independent wire member only for the aberration-correcting element is provided without superimposing and separating the driving signals, the elastic member (suspension) for supporting the optical unit may be influenced by the weight and tension of the wire member for the aberration-correcting element, and the actuator may be unable to maintain desired dynamic characteristics.

The present invention has been made in view of such circumstances, and an object of the present invention is to provide an actuator that reliably ensures desired characteristics in an optical pickup and that advantageously simplifies the configuration.

DISCLOSURE OF INVENTION

In order to achieve the above object, an actuator of the present invention includes a holder for integrally holding an objective lens through which a light beam from an optical pickup passes, and an aberration-correcting element disposed on the optical axis of the objective lens to be driven by the supply of an aberration-correcting driving signal; a suspension base opposing the holder; and at least four suspension members disposed between the holder and the suspension base to support the holder movably in a focusing direction and/or a tracking direction. The aberration-correcting driving signal is supplied to the aberration-correcting element through at least two of the suspension members.

According to the present invention, the aberration-correcting driving signal is supplied to the aberration-correcting element through at least two of the suspension members.

BRIEF DESCRIPTION OF THE DRAWINGS

FIG. 9A is a view showing the positional relationship between the suspension member and a holder in the first embodiment, and FIG. 9B is a view showing the positional relationship between suspension members and a holder in a modification.

BEST MODE FOR CARRYING OUT THE INVENTION

An embodiment of the present invention will now be described with reference to the drawings.

Figure 1:
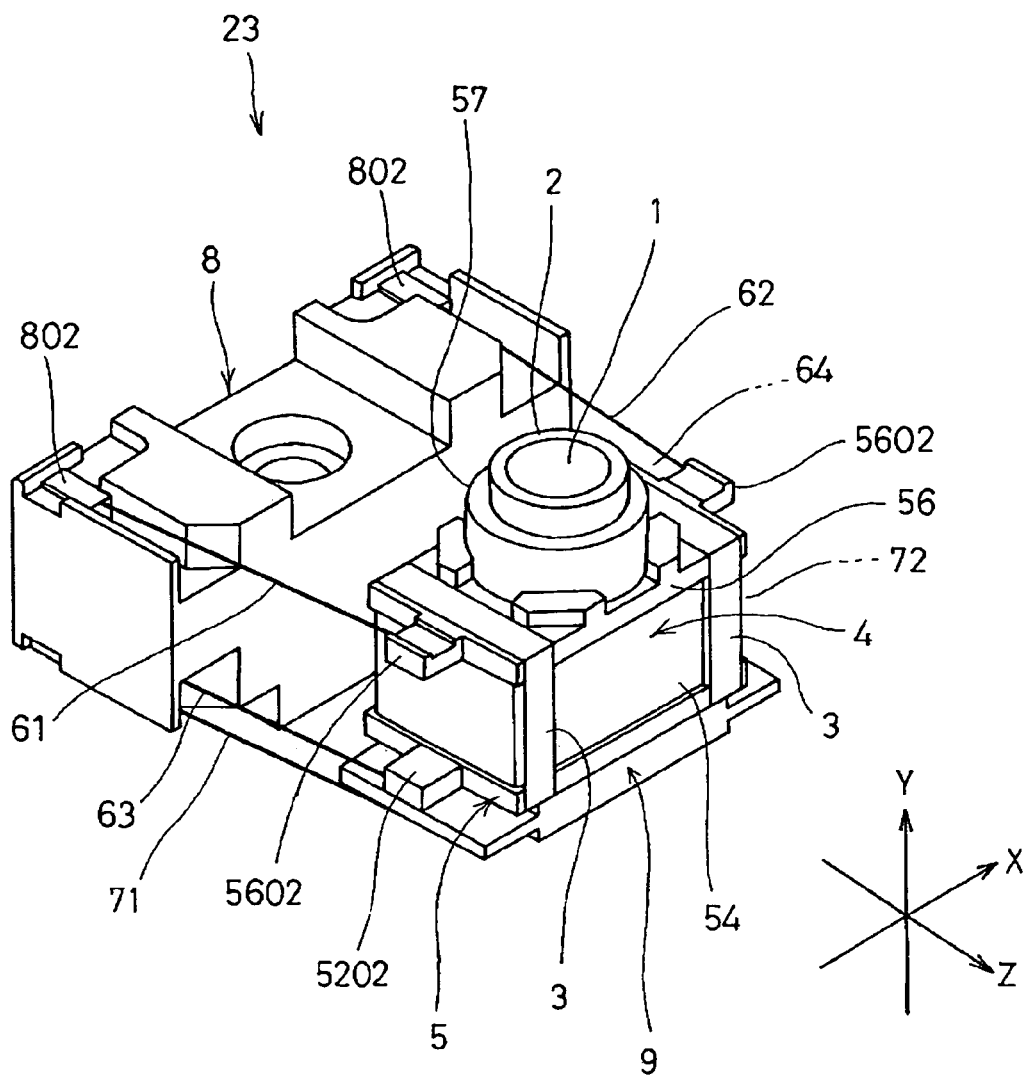
FIG. 1 is a perspective view showing the configuration of an actuator according to a first embodiment of the present invention.
Figure 2:
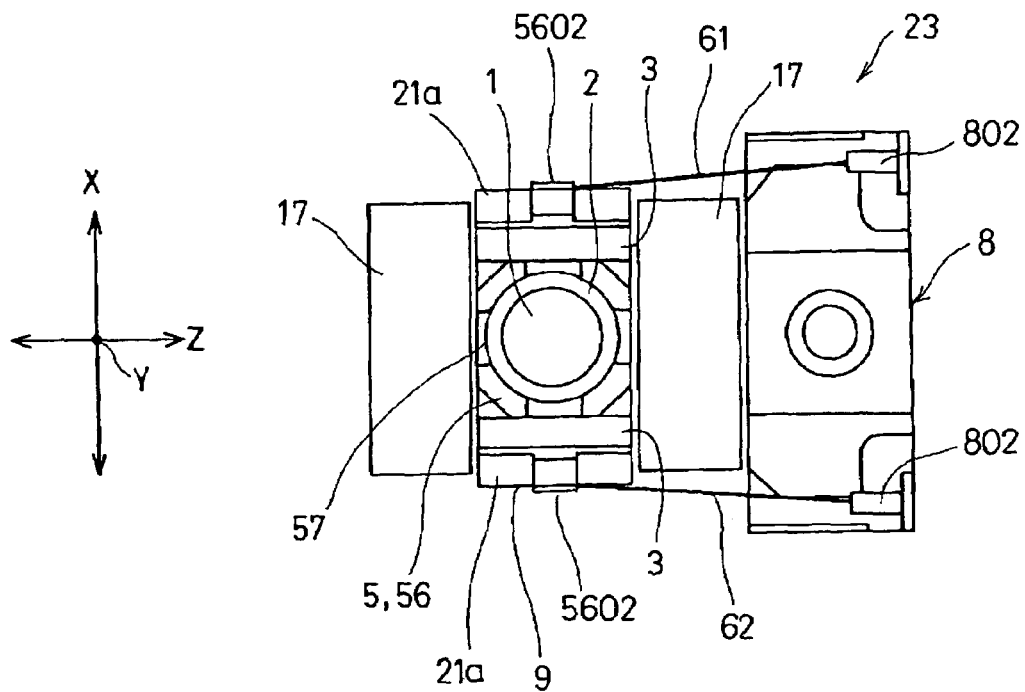
FIG. 2 is a bottom view of the actuator shown in FIG. 1.
Figure 3:
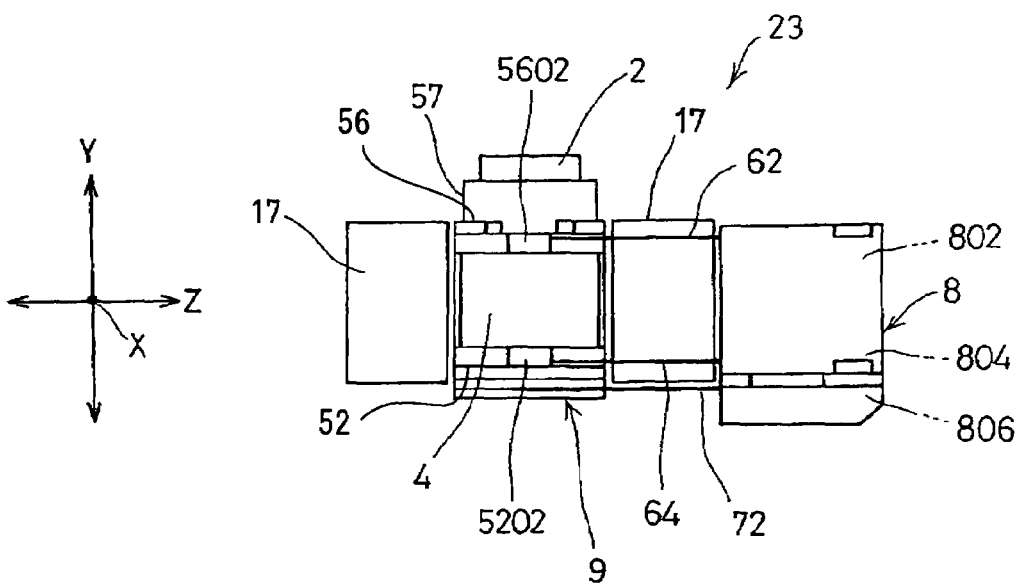
FIG. 3 is a side view of the actuator shown in FIG. 1.

FIG. 1 is a perspective view showing the configuration of an actuator according to a first embodiment of the present invention, FIG. 2 is a bottom view of the actuator shown in FIG. 1, and FIG. 3 is a side view of the actuator shown in FIG. 1.

An actuator 23 includes a lens holder 2 for holding an objective lens 1 of an optical pickup, a bobbin 5 for holding the lens holder 2, a suspension base 8, six suspension members 61, 62, 63, 64, 71, and 72 for connecting the bobbin 5 and the suspension base 8, an aberration-correcting element 9 attached to the bobbin 5, two permanent magnets 17 (FIG. 2), and so on.

In FIG. 1, the X-axis represents an imaginary axis extending in the tracking direction for an optical disc, the Y-axis represents an imaginary axis extending in the focusing direction for the optical disc, and the Z-axis represents an imaginary axis orthogonal to both the X-axis and the Y-axis. The Z-axis coincides with the direction of a line tangent to tracks on the optical disc.

The bobbin 5 is shaped like a hollow box by a rectangular bottom wall 52, four side walls 54 standing from four sides of the bottom wall 52, and a top wall 56 connecting the tops of the four side walls 54. The bottom wall 52 is disposed on one side in the Y-axis direction, and the top wall 56 is disposed on the other side in the Y-axis direction. The bottom wall 52 and the top wall 56 are parallel to a plane passing through both the X-axis and the Z-axis.

A cylindrical wall 57 protrudes from the top wall 56 in the Y-axis direction, and the lens holder 2 is fitted in the cylindrical wall 57. Connecting pieces 5602 protrude from both ends in the X-axis direction of the top wall 56.

A focusing coil 4 is wound around the four side walls 54, and the focusing coil 4 is wound around the Y-axis, that is, the optical axis of the objective lens 1.

Tracking coils 3 are wound around portions of the top wall 56 and the bottom wall 52 close to both ends in the X-axis direction, and the tracking coils 3 are wound around the axis extending in the X-axis direction.

The bottom wall 52 has an aperture at its center. A light beam passing through the objective lens 1 passes through the aberration-correcting element 9 disposed under the bottom wall 52 via the aperture. Connecting pieces 5202 protrude from both ends in the X-direction of the bottom wall 52 so that they oppose the connecting pieces 5602 of the top wall.

Figure 4:
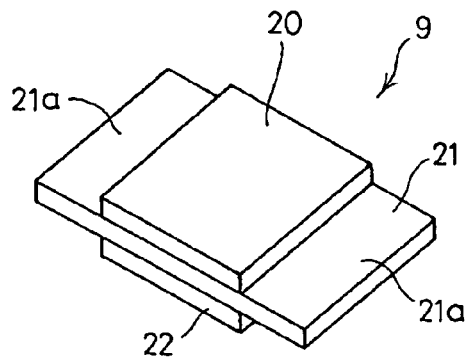
FIG. 4 is a perspective view showing the structure of an aberration-correcting element.
Figure 5:
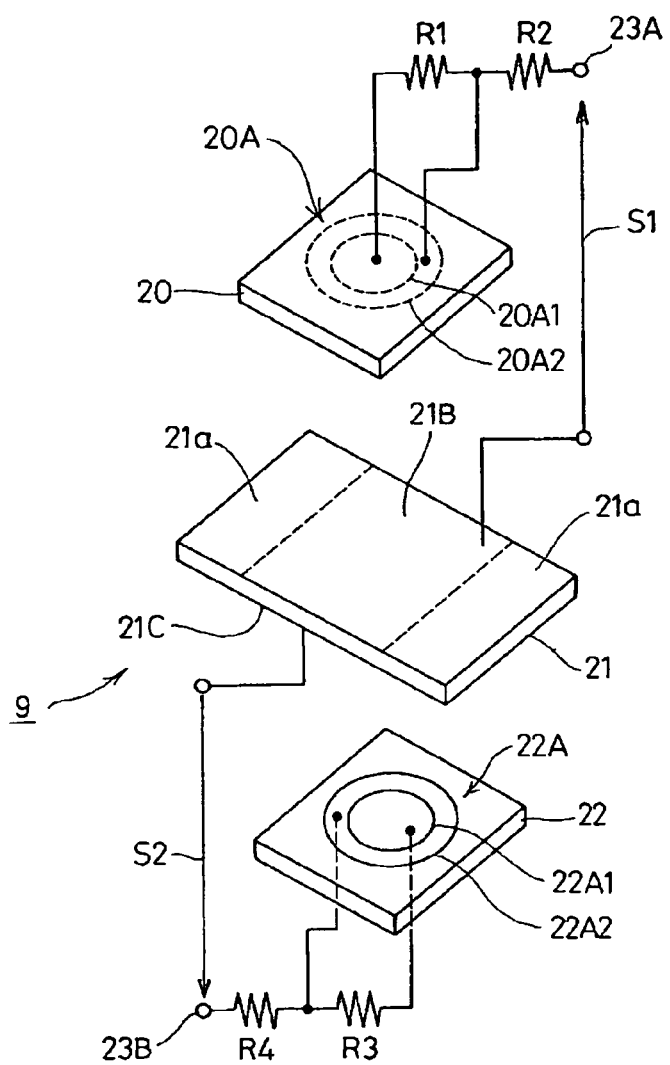
FIG. 5 is an exploded perspective view of the aberration-correcting element.

FIG. 4 is a perspective view showing the structure of the aberration-correcting element 9, and FIG. 5 is an exploded perspective view of the aberration-correcting element 9.

The aberration-correcting element 9 is formed by stacking three glass substrates, namely, a first glass substrate 20, a second glass substrate 21, and a third glass substrate 22. A space between the first and second glass substrates 20 and 21 and a space between the second and third glass substrates 21 and 22 are filled with liquid crystal.

The center second glass substrate 21 is shaped like a rectangular plate having a width and a length larger than the width. As shown in FIG. 1, the second glass substrate 21 is disposed so that its longitudinal direction extends along the X-axis direction.

The upper first glass substrate 20 and the lower third glass substrate 22 are shaped like a rectangular plate having a width equal to the width of the second glass substrate 21, and a length smaller than the length of the second glass substrate 21. In this embodiment, the first and third glass plates 20 and 22 are equal in shape and size.

The first and third glass substrates 20 and 22 are disposed at the center in the lengthwise direction of the second glass substrate 21 with the widthwise and lengthwise directions thereof are aligned with the widthwise and lengthwise directions of the second glass substrate 21.

Therefore, the first and third glass substrates 20 and 22 are not provided at end portions 21a of the second glass substrate 21 at both ends in the lengthwise direction, and the end portions 21a are exposed externally.

As shown in FIG. 5, a transparent electrode 20A is provided on a surface of the first glass substrate 20 facing the second glass substrate 21. The transparent electrode 20A includes a circular inner electrode 20A1 provided at the center, and an annular outer electrode 20A2 provided around the inner electrode 20A1.

A resistor R1 is connected between the inner electrode 20A1 and the outer electrode 20A2 of the first glass substrate 20. A resistor R2 is connected in serial to an end of the resistor R1 close to the outer electrode 20A2, and an end of the resistor R2 is connected to a first input terminal 23A provided in the end portions 21a.

A transparent electrode 22A is provided on a surface of the third glass substrate 22 facing the second glass substrate 21. The transparent electrode 22A includes a circular inner electrode 22A1 provided at the center, and an annular outer electrode 22A2 provided around the inner electrode 22A1.

The centers of the inner electrode 22A1 and the outer electrode 22A2 of the third glass substrate 22 match the centers of the inner electrode 20A1 and the outer electrode 20A2 of the first glass substrate 20.

A resistor R3 is connected between the inner electrode 22A1 and the outer electrode 22A2 of the third glass substrate 22. A resistor R4 is connected in serial to an end of the resistor R3 close to the outer electrode 22A2, and an end of the resistor R4 is connected to a second input terminal 20B provided in the end portion 21a.

A rectangular transparent electrode 21B is provided on a surface of the second glass substrate 21 facing the first glass substrate 20, and a rectangular transparent electrode 21C is provided on a surface of the second glass substrate 21 facing the third glass substrate 22. The transparent electrodes 21B and 21C are commonly connected to a ground line in the end portions 21a.

The aberration-correcting element 9 is mounted on the lower surface of the bottom wall 52 of the bobbin 5. Therefore, the aberration-correcting element 9 is provided at an end of the bobbin 5 at which the light beam passes.

More specifically, in a state in which the centers of the inner electrode 20A1 and the outer electrode 20A2 of the first glass substrate 20 and the centers of the inner electrode 22A1 and the outer electrode 22A2 of the third glass substrate 22 match the optical axis of the objective lens 1, an upper surface of the first glass substrate 20 is fixed to the lower surface by bonding, and the aberration-correcting element 9 is thereby combined with the bobbin 5.

When a first driving signal S1 is applied between the first input terminal 23A and the ground line, it is supplied to the inner electrode 20A1 and the outer electrode 20A2 of the first glass substrate 20 after being divided by the resistors R1 and R2.

When a second driving signal S2 is applied between the second input terminal 23B and the ground line, it is supplied to the inner electrode 22A1 and the outer electrode 22A2 of the third glass substrate 22 after being divided by the resistors R3 and R4.

Consequently, the polarization state of the liquid crystal between the first and second glass substrates 20 and 21 is changed in accordance with the first driving signal S1, and the polarization state of the liquid crystal between the second and third glass substrates 21 and 22 is changed in accordance with the second driving signal S2. As a result, the wavefront of a light beam passing through the objective lens 1 and the aberration-correcting element 9 is corrected, so that spherical aberration is corrected.

As shown in FIG. 1, the suspension base 8 is shaped like a box having a height along the Y-axis, a length along the X-axis larger than the height, and a width along the Z-axis, and is held by a base member (not shown) of the optical pickup so as to oppose the bobbin 5 with a space therebetween in the Z-axis direction. In this embodiment, the suspension base 8 is made of a resin material or the like.

As shown in FIGS. 2 and 3, first wire-mounting portions 802 are provided at both ends in the X-axis direction at the top of the suspension base 8, second wire-mounting portions 804 are provided below the first wire-mounting portions 802, and third wire-mounting portions 806 are provided under the second wire-mounting portions 804. The first to third wire-mounting portions 802, 804, and 806 are made of a solderable conductive material.

The suspension members 61, 62, 63, 64, 71, and 72 are made of a conductive material such as copper or beryllium copper, and are shaped like an elastically deformable rod of circular cross section. All the members are equal in size and shape.

One-end portions of the two suspension members 61 and 62 close to the objective lens 1, in other words, the two upper suspension members 61 and 62, of the six suspension members are fixed, respectively, to the two connecting pieces 5602 of the top wall 56 of the bobbin 5, that is, to both sides of the bobbin 5 between which the objective lens 1 is disposed. The other-end portions of the suspension members 61 and 62 are connected and fixed by soldering to the first wire-mounting portions 802 of the suspension base 8, that is, to both sides in the X-axis direction of the suspension base 8, and substantially extend in the Z-axis direction.

A signal line for supplying a driving signal (driving current) to the focusing coil 4 is electrically connected to one of the two first wire-mounting portions 802 of the suspension base 8, and a signal line maintained at a ground potential is electrically connected to the other of the two first wire-mounting portions 802. Accordingly, a focusing-coil driving current is supplied to the focusing coil 4 through the suspension members 61 and 62. The ground terminal is commonly connected to the ground line of the aberration-correcting element 9.

One-end portions of the two center suspension members 63 and 64 below the two upper suspension members 61 and 62, of the six suspension members, are fixed to the two connecting pieces 5202 of the bottom wall 52 of the bobbin 5, that is, to both sides of the bobbin 5 between which the objective lens 1 is disposed. The other-end portions of the suspension members 63 and 64 are connected and fixed, for example, by soldering, to the second wire-mounting portions 804 of the suspension base 8, that is, to both sides of the suspension base 8 spaced in the X-axis direction, and substantially extend in the Z-axis direction.

A signal line for supplying a driving signal (driving current) to the tracking coils 3 is electrically connected to one of the two second wire-mounting portions 804 of the suspension base 8, and a signal line maintained at the ground potential is electrically connected to the other of the two second wire-mounting portions 804. Accordingly, a tracking-coil driving signal is supplied to the tracking coils 3 through the suspension members 63 and 64.

One-end portions of the two lower suspension members 71 and 72 below the center suspension members, of the six suspension members, are fixed to the end portions 21a of the aberration-correcting element 9 at both ends in the X-axis direction, that is, to both sides of the aberration-correcting element 9 between which the objective lens 1 is disposed. The other-end portions of the suspension members 71 and 72 are connected and fixed, for example, by soldering, to the third wire-mounting portions 806 of the suspension base 8, that is, to both sides of the suspension base 8 spaced in the X-axis direction, and substantially extend in the Z-axis direction.

The one-end portions of the suspension members 71 and 72 are electrically connected to the first and second input terminals 23A and 23B of the aberration-correcting element 9, for example, by soldering.

A signal line for supplying the first driving signal S1 is electrically connected to one of the two third wire-mounting portions 806 of the suspension base 8, and a signal line for supplying the second driving signal S2 is electrically connected to the other of the two third wire-mounting portions 806. Accordingly, the first and second driving signals S1 and S2 are supplied to the aberration-correcting element 9 through the suspension members 71 and 72.

More specifically, the first driving signal S1 is supplied to the first input terminal 23A through the ground terminal of the suspension member 71 (72) commonly connected to first input terminal 23A and the ground line of the aberration-correcting element 9. Similarly, the second driving signal S2 is supplied to the second input terminal 23B through the ground terminal of the suspension member 71 (72) commonly connected to the second input terminal 23B and the ground line of the aberration-correcting element 9.

As shown in FIG. 1, the two upper suspension members 61 and 62 are disposed on a first single plane parallel to an XZ-plane including the X-axis and the Z-axis and on both sides of the objective lens 1, the two center suspension members 63 and 64 are disposed below the two upper suspension members 61 and 62, on a second single plane parallel to the first plane, and on both sides of the objective lens 1, and the two suspension members 71 and 72 are disposed below the two center suspension members 63 and 64, on a third single plane parallel to the second plane, and on both sides of the objective lens 1.

The three upper, center, and lower suspension members 61, 63, and 71 on one side in the X-axis direction of the objective lens 1 extend parallel to one another on a single plane orthogonal to the XZ-plane.

The three upper, center, and lower suspension members 62, 64, and 72 on the other side in the X-axis direction of the objective lens 1 extend parallel to one another on a single plane orthogonal to the XZ-plane.

Therefore, the bobbin 5 is connected to the suspension base 8 by the six suspension members 61, 62, 63, 64, 71, and 72 so that it can translate in the Y-axis direction and can translate in the X-axis direction.

The sectional shape, length, and arrangement of the suspension members 61, 62, 63, 64, 71, and 72 are designed in consideration of the spring constant thereof. The design is conducted so that the dynamic characteristics of the actuator 23 are improved and so that unexpected vibrations and loads will not occur.

The permanent magnets 17 are disposed on both sides in the Z-axis direction of the bobbin 5, as shown in FIGS. 2 and 3. The permanent magnets 17 are mounted on the base member of the optical pickup.

Lines of magnetic force of the permanent magnets 17 pass through the tracking coils 3 and the focusing coil 4.

In this embodiment, the suspension members 61, 62, 63, 64, 71, and 72 respectively form the first, second, third, fourth, fifth, and sixth suspension members in the claims.

A description will now be given of the operation of the actuator 23 having the above-described configuration.

A light beam passing through the objective lens 1 is corrected for aberration as follows:

That is, when a first driving signal S1 for aberration correction is supplied to the aberration-correcting element 9 through one of the lower suspension members 71, and a second driving signal S2 for aberration correction is supplied to the aberration-correcting element 9 through the other lower suspension member 72, the polarization state of the liquid crystal in the aberration-correcting element 9 is changed in accordance with the first and second driving signals S1 and S2. By adjusting the polarization state, a light beam passing through the liquid crystal is corrected for aberration.

The position in the Y-axis direction is adjusted in the actuator 23 as follows:

That is, when a focusing-coil driving signal is supplied to the focusing coil 4 through the two upper suspension members 61 and 62 of the actuator 23, a magnetic field is generated in the focusing coil 4, and an electromagnetic force in the Y-axis direction is generated by the interaction between the magnetic field and a magnetic field of the permanent magnets 17. The bobbin 5 and the aberration-correcting element 9 are shifted together in the Y-axis direction by the electromagnetic force, thereby adjusting the positions in the Y-axis direction of the objective lens 1 and the aberration-correcting element 9 with respect to the optical disc.

The position in the X-axis direction is adjusted in the actuator 23 as follows: That is, when a tracking driving signal is supplied to the tracking coils 3 through the two center suspension members 63 and 64 of the actuator 23, a magnetic field is generated in the tracking coils 3, and an electromagnetic force in the X-axis direction is generated by the interaction between the magnetic field and a magnetic field of the permanent magnets 17. The bobbin 5 and the aberration-correcting element 9 are shifted together in the X-axis direction by the electromagnetic force, thereby adjusting the positions in the X-axis direction of the objective lens 1 and the aberration-correcting element 9 with respect to the optical disc.

As described above, in the actuator 23 of this embodiment, the objective lens 1 and the aberration-correcting element 9 are held together by the bobbin 5, the bobbin 5 is supported by the six suspension members 61, 62, 63, 64, 71, and 72 so that it can move in the focusing direction (Y-axis direction) and in the tracking direction (X-axis direction), and the first and second driving signals S1 and S2 for driving the aberration-correcting element 9 are supplied to the aberration-correcting element 9 through the two suspension members 71 and 72 of the suspension members.

Since the first and second driving signals S1 and S2 are not superimposed on the driving signals for driving the tracking coil and the focusing coil, the S/N ratio of the driving signals can be prevented from decreasing. This is advantageous in achieving desired characteristics of the actuator.

Since it is unnecessary to adopt structures for superimposing and separating the first and second driving signals S1 and S2 on and from the driving signals for driving the tracking coils and the focusing coil, the configuration can be simplified. This is advantageous in reducing the production cost and parts cost.

Compared with the structure in which independent wires only for the aberration-correcting element are provided, the suspension members are less subject to the influence of the weight and tension of the wires for the aberration-correcting element. Therefore, desired dynamic characteristics of the actuator can be achieved advantageously.

Since the six suspension members are used in this embodiment, the rigidity in the torsional direction can be made higher than in the normal biaxial actuator using four suspension members. Therefore, the optical axis of the objective lens 1 can be restrained from being tilted by the movement of the bobbin 5 in the Y-axis direction and the X-axis direction, and the characteristics of the actuator can be improved advantageously.

In this embodiment, since the two lower suspension members 71 and 72 for supplying the first and second driving signals S1 and S2 to the aberration-correcting element 9 are disposed on the single plane parallel to the XZ-plane and on both sides of the objective lens 1, the end portions 21a of the aberration-correcting element 9 are positioned adjacent to the two lower suspension members 71 and 72. For this reason, routing of wires that connect the suspension members 71 and 72 and the end portions 21a of the aberration-correcting element 9 can be simplified advantageously.

While the six suspension members are formed beforehand, and the suspension members are attached to the bobbin 5 and the aberration-correcting element 9, and to the suspension base 8, for example, by soldering in the above embodiment, the two lower suspension members 71 and 72 may be attached to the aberration-correcting element 9 and the suspension base 8 by the following etching method.

Figure 6:
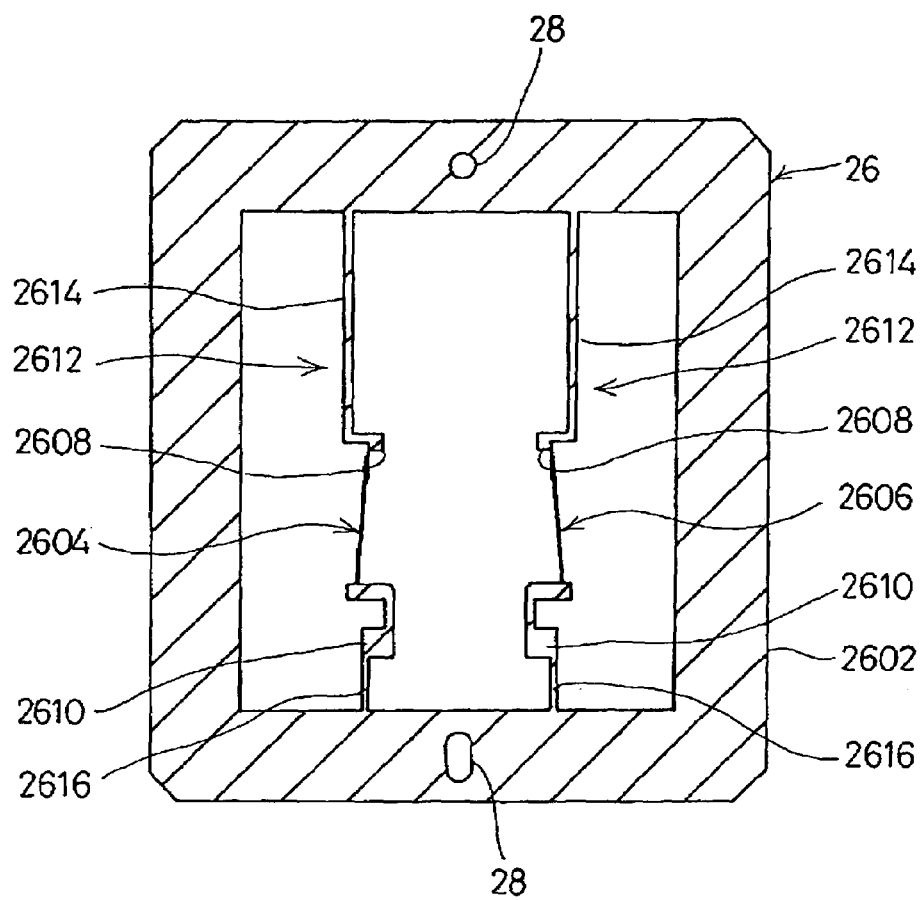
FIG. 6 is an explanatory view showing an example of a production method for suspension members.

As shown in FIG. 6, a rectangular frame 2602 and two belt portions 2612 connected to the frame are formed, as hatched in the figure, by etching a thin rectangular copper plate 26.

The belt portions 2612 respectively include suspension portions 2604 and 2606 provided between upper portions 2614 and lower portions 2616.

An end portion 2608 for connecting the aberration-correcting element is provided at the lower end of each upper portion 2614, and an end portion 2610 for connecting the suspension base is provided at the upper end of each lower portion 2616.

The suspension portions 2604 and 2606 are provided between the end portions 2608 and 2610, and the two suspension portions 2604 and 2606 are precisely formed so that they are equal in sectional shape and length and so that they are provided symmetrically in the lateral direction.

High-precision positioning holes 28 are provided through portions of the frame 2602 at both ends in the extending direction of the belt portions 2612.

Figure 7:
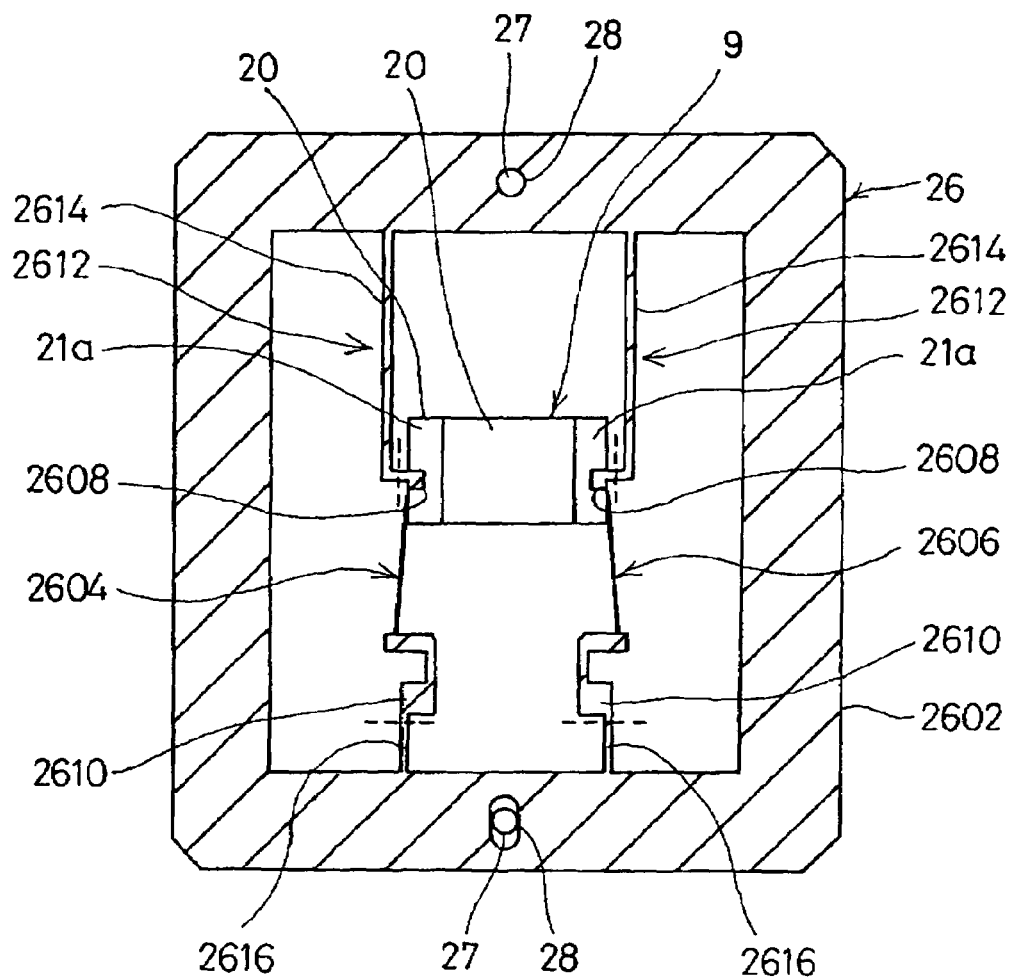
FIG. 7 is an explanatory view showing the example of the production method for the suspension members.

As shown in FIG. 7, the copper plate 26 is positioned on the aberration-correcting element 9 placed at a predetermined position by a positioning jig that is not shown.

That is, two high-precision positioning pins 27 projecting from the jig are inserted in the two positioning holes 28 of the copper plate 26, so that the two suspension portions 2604 and 2606 are precisely positioned with respect to the aberration-correcting element 9.

In this state, the aberration-correcting-element connecting end portions 2608 of the two suspension portions 2604 and 2606 are electrically connected and fixed to the input terminals for the first and second driving signals S1 and S2 provided in the end portions 21a of the aberration-correcting element 9, for example, by soldering.

Figure 8:
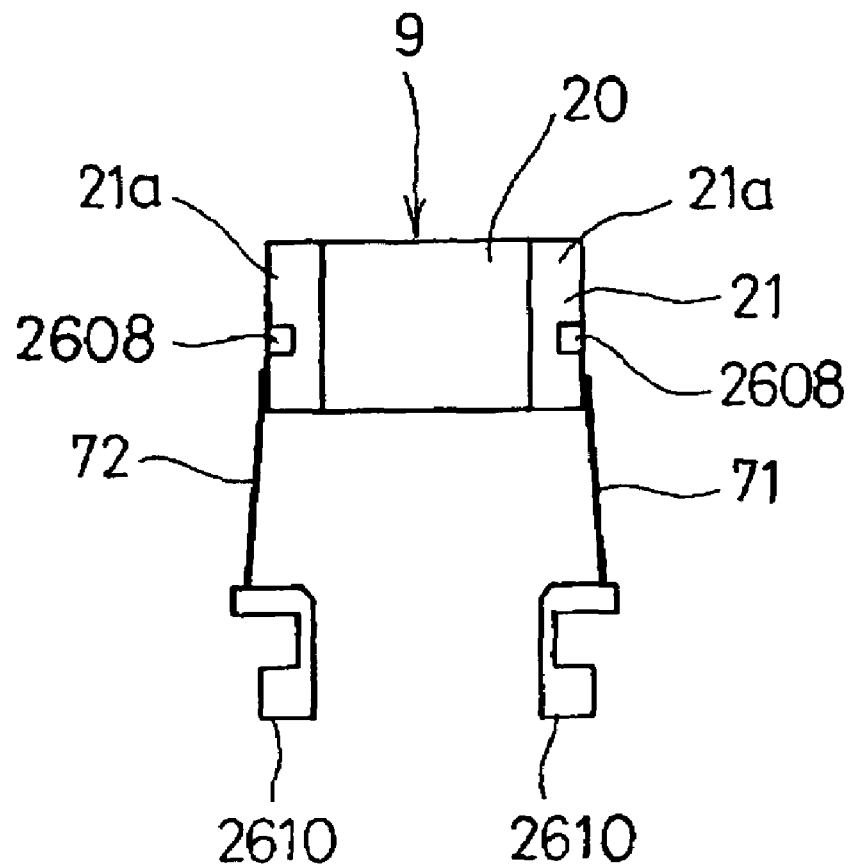
FIG. 8 is a view showing the connection between the suspension members and the aberration-correcting element.

After being positioned and fixed, the two suspension portions 2604 and 2606 are cut at positions shown by broken lines in FIG. 7 by a tool with a light cutting load, such as a ultrasonic cutter, and are thereby separated into the suspension members 71 and 72, as shown in FIG. 8. One-end portions of the suspension members 71 and 72 are connected to the aberration-correcting element 9, and the other-end portions are combined with the suspension-base connecting end portions 2610.

Subsequently, the suspension-base connecting end portions 2610 of the two suspension members 71 and 72 are electrically connected and fixed to the wire-mounting portions 806 of the suspension base 8 (FIG. 3), for example, by soldering. In this case, fixing is performed so that the suspension members 71 and 72 do not sag.

The positional relationship between the suspension members 71 and 72, and the other four suspension members 61 to 64 fixed to the bobbin 5 is similar to that in the above-described embodiment, and therefore, a description thereof is omitted.

When the suspension members 71 and 72 are thus formed by forming the suspension portions 2604 by etching and by cutting the suspension portions 2604, the accuracy of shape and size of the suspension members 71 and 72 can be advantageously increased.

By connecting the suspension portions 2604 and 2606, which are formed by etching, to the aberration-correcting element 9, the accuracy of the relative positions of the aberration-correcting element 9 and the suspension members 71 and 72 can be advantageously increased.

The two upper suspension members 61 and 62 and the two center suspension members 63 and 64 can also be produced in a manner similar to that in the above-described two lower suspension members 71 and 72.

While the cross section of the six suspension members 61, 62, 63, 64, 71, and 72 is circular in this embodiment, it may have shapes other than the circular shape, for example, a rectangular shape.

While all the end portions of the six suspension members 61, 62, 63, 64, 71, and 72 are fixed to the single suspension base 8 in this embodiment, the end portions of some of the suspension members may be fixed to a member separate from the suspension base 8 as long as the relative positional relationship among the suspension members is not changed.

In this embodiment, as shown in FIGS. 9A and 1, the first and second suspension members 61 and 62 (two upper suspension members), the third and fourth suspension members 63 and 64 (two center suspension members), and the fifth and sixth two suspension members 71 and 72 (two lower suspension members) are disposed on both sides of the objective lens 1 on the first single plane, the second single plane, and the third single plane parallel to the XZ-plane including the X-axis and the Z-axis. Moreover, the three first, third, and fifth suspension members 61, 63, and 71 disposed on one side in the X-axis direction of the objective lens 1 extend parallel to one another on a single plane orthogonal to the XZ-plane. The three second, fourth, and sixth suspension members 62, 64, and 72 disposed on the other side in the X-axis direction of the objective lens 1 extend parallel to one another on a single plane orthogonal to the XZ-plane.

Figure 10:
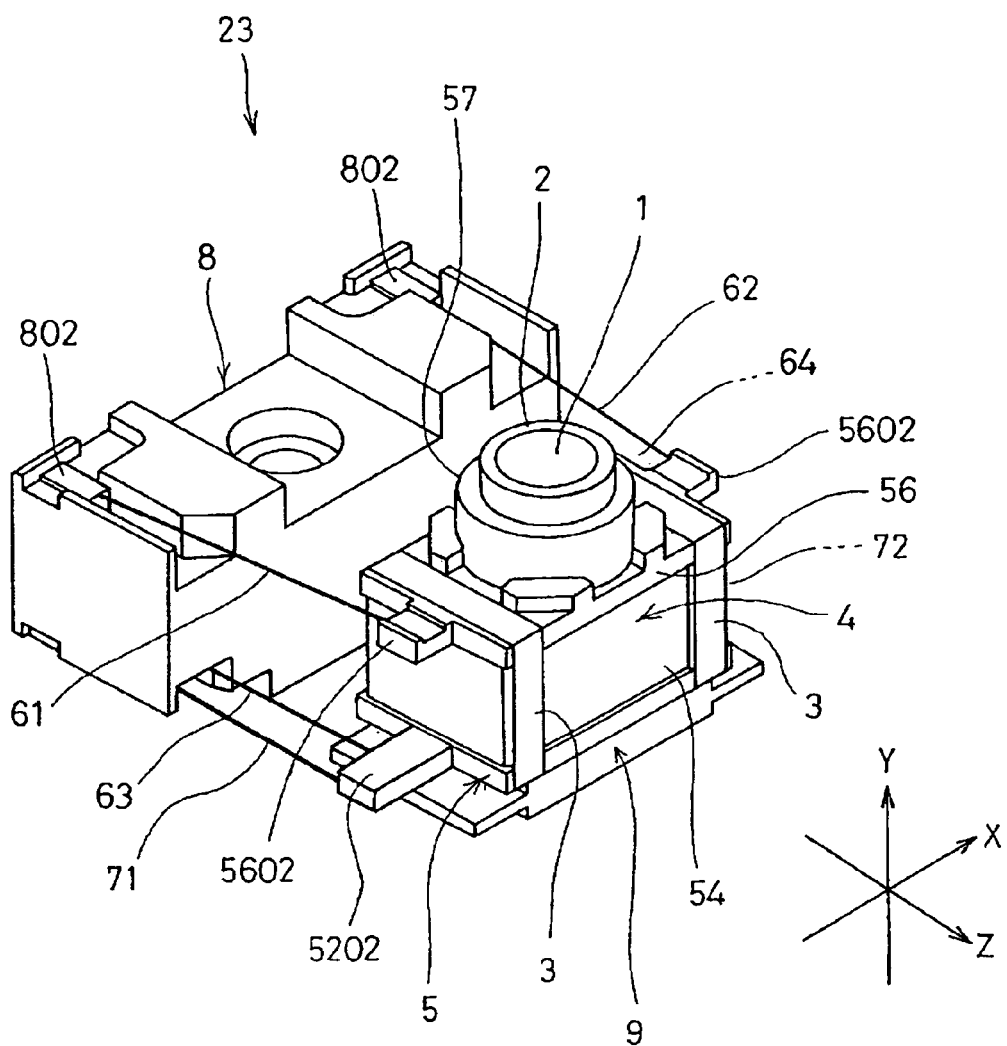
FIG. 10 is a perspective view showing the configuration of an actuator in the modification.

However, as shown in FIGS. 9B and 10, the suspension members may be arranged in a manner different from that in the above embodiment.

That is, the first and second suspension members 61 and 62 are disposed on both sides of the objective lens 1 on the first single plane parallel to the XZ-plane including the X-axis and the Z-axis, and the third and fourth suspension members 63 and 64 are disposed on both sides of the objective lens 1 on the second single plane spaced in parallel from the first plane in the Y-axis direction. The fifth and sixth suspension members 71 and 72 are disposed on both sides of the objective lens 1 on the second single plane outside the third and fourth suspension members 63 and 64.

Furthermore, the first and third suspension members 61 and 63 on one side in the X-axis direction of the objective lens 1 extend parallel to each other on a single plane orthogonal to the XZ-plane, and the second and fourth suspension members 62 and 64 on the other side in the X-axis direction of the objective lens 1 extend parallel to each other on a single plane orthogonal to the XZ-plane.

In other words, the suspension members include the first to sixth suspension members 61, 62, 63, 64, 71, and 72. When it is assumed that an imaginary axis extending in the tracking direction is designated the X-axis, an imaginary axis extending in the focusing direction is designated the Y-axis, and an imaginary axis orthogonal to the X-axis and the Y-axis is designated the Z-axis, the first and second suspension members 61 and 62 are provided from the holder (bobbin 5) to the suspension base 8 on both sides of the objective lens 1 and on the first single plane parallel to the XZ-plane including the X-axis and the Z-axis, the third and fourth suspension members 63 and 64 are provided from the holder to the suspension base 8 on both sides of the objective lens 1 and on the second single plane spaced in parallel from the first plane in the Y-axis direction and the traveling direction of a light beam, and the fifth and sixth suspension members 71 and 72 are provided on the second plane from the aberration-correcting element 9 to the suspension base 8 on both sides of the objective lens 1 and outside the third and fourth suspension members 63 and 64. The first and second aberration-correcting driving signals S1 and S2 are supplied to the aberration-correcting element 9 through the fifth and sixth suspension members 71 and 72.

The first and third suspension members 61 and 63 extend parallel to each other and with a space therebetween on the single plane orthogonal to the XZ-plane, and the second and fourth suspension members 62 and 64 extend parallel to each other and with a space therebetween on the single plane orthogonal to the XZ-plane.

While the actuator adjusts the position in two directions, that is, the X-axis direction and the Y-axis direction, in this embodiment, the present invention is, of course, also applicable to an actuator that adjusts the position in only one of the two directions of the X-axis direction and the Y-axis direction.

In this case, first and second suspension members for supplying a driving signal to one of the tracking coil and the focusing coil, and third and fourth suspension members for supplying the driving signals S1 and S2 to the aberration-correcting element are provided as the suspension members.

The first and second suspension members are disposed on both sides of the bobbin 5 and the suspension base 8 on the first single plane parallel to the XZ-plane so that the objective lens 1 is disposed therebetween, and the third and fourth suspension members are disposed on both sides of the aberration-correcting element 9 and the suspension base 8 on the second single plane parallel to the first plane so that the objective lens 1 is disposed therebetween. The first and third suspension members extend with a space therebetween and parallel to each other on the single plane orthogonal to the XZ-plane on one side of the objective lens 1. The second and fourth suspension members extend with a space therebetween and parallel to each other on the single plane orthogonal to the XZ-plane on the other side of the objective lens 1.

In such a configuration, the S/N ratio of the driving signals supplied to the actuator can be prevented from being decreased, and desired characteristics of the actuator can be advantageously achieved, in a manner similar to that in the above-described embodiment. Moreover, the configuration is simplified, and the production cost and parts cost can be reduced. Since the suspension members are not influenced by the weight and tension of the wires for the aberration-correcting element, desired dynamic characteristics of the actuator can be ensured advantageously.

As described above, according to the present invention, it is possible to provide an actuator that reliably ensures desired characteristics in an optical pickup and that advantageously simplifies the configuration.

The invention claimed is:

1. An actuator comprising:
a holder for integrally holding an objective lens through which a light beam from an optical pickup passes, and an aberration-correcting element disposed on the optical axis of the objective lens to be driven by the supply of an aberration-correcting driving signal and mounted on a lower surface of the holder;
a suspension base opposing the holder; and
at least six suspension members disposed between the holder and the suspension base to support the holder movably in a focusing direction and/or a tracking direction, wherein two of the suspension members are respectively disposed below the other four suspension members on opposite sides of said objective lens, three of the suspension members are provided on one side of the objective lens and the other three of the suspension members are provided on the other side of the objective lens, one of said two suspension members being on one side of the objective lens, the other of said two suspension members being on the other side of said objective lens;
wherein the aberration-correcting driving signal is supplied to the aberration-correcting element through said two of the suspension members,
wherein the holder includes a bobbin for holding the objective lens, the aberration-correcting element is provided at an end of the bobbin through which the light beam passes, and the two suspension members through which the aberration-correcting driving signal is supplied to the aberration-correcting element are directly attached to the two ends of the aberration-correcting element and the suspension base at a position lower than the other four of the suspension members, and
wherein, when an imaginary axis extending in the tracking direction is designated as an X-axis, an imaginary axis extending in the focusing direction is designated as a Y-axis, and an imaginary axis orthogonal to the X-axis and the Y-axis is designated as a Z-axis, the first and second suspension members are provided between the holder and the suspension base on both sides of the objective lens and on a first single plane parallel to an XZ-plane including the X-axis and the Z-axis, the third and fourth suspension members are provided between the holder and the suspension base on both sides of the objective lens and on a second single plane spaced in parallel from the first plane along the Y-axis and in a traveling direction of the light beam, and the fifth and sixth suspension members are provided between the aberration-correcting element and the suspension base on both sides of the objective lens and on a third single plane spaced in parallel from the second plane along the Y-axis and the traveling direction of the light beam,
wherein the aberration-correcting driving signal is supplied to the aberration-correcting element through the fifth and sixth suspension members, and
wherein the first, third, and fifth suspension members extend apart and parallel to one another on a single plane orthogonal to the XZ-plane, and the second, fourth, and sixth suspension members extend apart and parallel to one another on a single plane orthogonal to the XZ-plane.

2. An actuator according to claim 1, wherein the holder has a coil, the coil moves the holder in the focusing direction or the tracking direction by an electromagnetic force generated by the supply of a coil driving signal, and the coil driving signal is supplied to the coil through the suspension members other than the suspension members through which the aberration-correcting driving signal is supplied.

3. An actuator according to claim 1, wherein the aberration-correcting element corrects the light beam for aberration by correcting a wavefront of the light beam passing through the objective lens and the aberration-correcting element.

4. An actuator according to claim 1, wherein the suspension members are elastically deformable.

5. An actuator according to claim 1, wherein the suspension members are composed of the same material and have the same shape.

6. An actuator according to claim 1, wherein each of the suspension members is composed of a conductive material.

7. An actuator according to claim 1, wherein said objective lens comprises part of an optical pickup.

8. An actuator according to claim 1, wherein said objective lens and said aberration-correcting element cooperate to adjust positions with respect to an optical disc.

9. An optical pickup having an actuator comprising:
a holder for integrally holding an objective lens of said pickup through which a light beam from an optical pickup passes, and an aberration-correcting element disposed on the optical axis of the objective lens to be driven by the supply of an aberration-correcting driving signal and mounted on a lower surface of the holder;
a suspension base opposing the holder; and
at least six suspension members disposed between the holder and the suspension base to support the holder movably in a focusing direction and/or a tracking direction, wherein two of the suspension members are respectively disposed below the other four suspension members on opposite sides of said objective lens, three of the suspension members are provided on one side of the objective lens and the other three of the suspension members are provided on the other side of the objective lens, one of said two of the suspension members being on said one side of the objective lens, and the other of said two suspension members being on the other side of said objective lens;
wherein the aberration-correcting driving signal is supplied to the aberration-correcting element through said two of the suspension members,
wherein the holder includes a bobbin for holding the objective lens, the aberration-correcting element is provided at an end of the bobbin through which the light beam passes, and the two suspension members through which the aberration-correcting driving signal is supplied to the aberration-correcting element are directly attached to the two ends of the aberration-correcting element and the suspension base at a position lower than the other four of the suspension members, and
wherein, when an imaginary axis extending in the tracking direction is designated as an X-axis, an imaginary axis extending in the focusing direction is designated as a Y-axis, and an imaginary axis orthogonal to the X-axis and the Y-axis is designated as a Z-axis, the first and second suspension members are provided between the holder and the suspension base on both sides of the objective lens and on a first single plane parallel to an XZ-plane including the X-axis and the Z-axis, the third and fourth suspension members are provided between the holder and the suspension base on both sides of the objective lens and on a second single plane spaced in parallel from the first plane along the Y-axis and in a traveling direction of the light beam, and the fifth and sixth suspension members are provided between the aberration-correcting element and the suspension base on both sides of the objective lens and on a third single plane spaced in parallel from the second plane along the Y-axis and the traveling direction of the light beam, wherein the aberration-correcting driving signal is supplied to the aberration-correcting element through the fifth and sixth suspension members, and wherein the first, third, and fifth suspension members extend apart and parallel to one another on a single plane orthogonal to the XZ-plane, and the second, fourth, and sixth suspension members extend apart and parallel to one another on a single plane orthogonal to the XZ-plane.

* * * * *